US008230069B2

(12) United States Patent
Korupolu

(10) Patent No.: US 8,230,069 B2
(45) Date of Patent: Jul. 24, 2012

(54) SERVER AND STORAGE-AWARE METHOD FOR SELECTING VIRTUAL MACHINE MIGRATION TARGETS

(75) Inventor: Madhukar R. Korupolu, Sunnyvale, CA (US)

(73) Assignee: International Business Machines Corporation, Armonk, NY (US)

( * ) Notice: Subject to any disclaimer, the term of this patent is extended or adjusted under 35 U.S.C. 154(b) by 672 days.

(21) Appl. No.: 12/042,233

(22) Filed: Mar. 4, 2008

(65) Prior Publication Data

US 2009/0228589 A1 Sep. 10, 2009

(51) Int. Cl.
G06F 15/173 (2006.01)
G06F 15/16 (2006.01)
(52) U.S. Cl. ........................ 709/226; 709/229
(58) Field of Classification Search ............ 709/226
See application file for complete search history.

(56) References Cited

U.S. PATENT DOCUMENTS

| | | | |
|---|---|---|---|
| 6,697,849 B1 * | 2/2004 | Carlson ......................... | 709/219 |
| 6,845,503 B1 * | 1/2005 | Carlson et al. ................. | 717/166 |
| 6,859,834 B1 * | 2/2005 | Arora et al. .................... | 709/227 |
| 6,879,995 B1 * | 4/2005 | Chinta et al. ................... | 709/204 |
| 6,941,410 B1 | 9/2005 | Traversat et al. | |
| 7,269,696 B2 | 9/2007 | Muhlestein et al. | |
| 2003/0135609 A1 * | 7/2003 | Carlson et al. ................. | 709/224 |
| 2004/0025162 A1 * | 2/2004 | Fisk ............................. | 718/105 |
| 2004/0054850 A1 * | 3/2004 | Fisk ............................. | 711/112 |
| 2004/0215746 A1 * | 10/2004 | McCanne et al. .............. | 709/219 |
| 2005/0228835 A1 | 10/2005 | Roa | |
| 2005/0249199 A1 * | 11/2005 | Albert et al. ................... | 370/352 |
| 2007/0038998 A1 | 2/2007 | Fries | |
| 2008/0256082 A1 * | 10/2008 | Davies et al. .................. | 707/10 |

OTHER PUBLICATIONS

Lowell, D. et al., Devirtualization Virtual Machines Enabling General, Single-Node, Online Maintenance, ASPLOS '04, Oct. 9-13, 2004, pp. 211-223.
Khanna, G. et al., Application Performance Management in Virtualized Server Environments, Network Operations and Mgmt Symposium, 2006. NOMS 2006. 10th IEEE/IFIP, pp. 373-381.
Bradford, R. et al., Live Wide-Area Migration of Virtual Machines Including Local Persistent State, Proc. 3rd Int'l Conf. on Virtual Execution Environments, 2007, pp. 169-179.
Wells, P. et al., Hardware Support for Spin Management in Overcommitted Virtual Machines, Proc. 15th Int'l Conf. Parallel Architectures & Compil Techniques, 2006, pp. 124-133.
Milojicic, D. et al., Process Migration, ACM Computing Surveys, Sep. 2000, pp. 241-299, vol. 32, No. 3.

(Continued)

*Primary Examiner* — Jeffrey Pwu
*Assistant Examiner* — Gerald Smarth
(74) *Attorney, Agent, or Firm* — Kenneth L. Sherman, Esq.; Michael Zarrabian, Esq.; Sherman & Zarrabian LLP

(57) ABSTRACT

A method and system selecting a target physical machine for a virtual machine (VM) migration is provided. Selecting a target physical machine for a VM migration involves determining storage volume connectivity and spare path capacity of one or more candidate physical machines, and preferentially selecting among the candidate physical machines a migration target with storage volume connectivity and spare path capacity to satisfy storage volume access requirements of the VM.

16 Claims, 3 Drawing Sheets

OTHER PUBLICATIONS

VMWare DRS, Distributed Resource Scheduler, http://www.vmware.com/products/vi/vc/drs.html, Mar. 3, 2008.
Wood, T. et al., Black-box and Grey-box Strategies for Virtual Machine Migration, Proc. of USENIX NSDI 2007, www.cs.umass.edu/~twood/pubs/NSDI07.pdf.
VMWare Inc., http://www.vmware.com/, Mar. 3, 2008.
Barham, P., Xen and the Art of Virtualization, Proc. ACM Symp. on Operating Systems Principles, 2003, pp. 164-177.
Nelson, M., Fast Transparent Migration for Virtual Machines (VMotion), Proc. of USENIX Annual Tech Conf., 2005, pp. 391-394.
Clark C. et al., Live Migration of Virtual Machines, Proc. of USENIX NSDI '05, 2nd Symp. Networked Systems Design & Implementation, ppl. 273-286.
Bobroff, N., Dynamic Placement of Virtual Machines for Managing SLA Violations, 10th IFIP/IEEE Int'l Symp. on Integrated Network Mgmt., May 2007, pp. 119-128.

* cited by examiner

SERVER AND STORAGE-AWARE METHOD FOR SELECTING VIRTUAL MACHINE MIGRATION TARGETS

BACKGROUND OF THE INVENTION

1. Field of the Invention

The invention relates to virtual machines and in particular to selecting virtual machine migration targets.

2. Background Information

Processing virtualization involves simulating several virtual machines (VMs), each running a separate operating system (OS) instance. Each OS may run in a different VM. For example, Xen is a virtual machine monitor (VMM), also know as a hypervisor, for managing the VMs that execute on a host operating system to provide the functionality of several guest operating systems on top of the host, on the same computer hardware (physical machine), at the same time. Server virtualization technologies are becoming increasingly commonplace in data centers. These enable applications to be packaged inside virtual machines and allow multiple VMs to run on a single physical machine without interfering with each other. This provides increased utilization of resources and consolidation of server, space and data center costs.

Some systems allow VMs to be migrated from one physical machine to another in real-time without much client perceived downtime. This provides a valuable tool for data center administration for balancing loads and dealing with workload growth and node outages. Certain VM migration techniques determine proper VM migrations (from a source physical machine to a target physical machine) based on server-side parameters only. Such techniques involve monitoring VM resource usages and needs (e.g., CPU, memory, network bandwidth, etc.) dynamically, and responding to hotspots by migrating VMs to other physical machines such as servers, with sufficient remaining capacity along these dimensions.

However, such VM migration techniques select target machines only based on availability of processing capacity (e.g., CPU, memory, network bandwidth) at potential target machines. This, however, leads to selecting a migration target machine that has poor or overloaded connectivity to the storage volumes that a migrating VM accesses, leading to degraded performance.

BRIEF SUMMARY OF THE INVENTION

The invention provides a method and system of storage-aware selection of virtual machine migration targets. In one embodiment, a method and system selecting a target physical machine for a virtual machine (VM) migration, involves determining storage volume connectivity and spare path capacity of one or more candidate physical machines, and preferentially selecting among the candidate physical machines a migration target with storage volume connectivity and spare path capacity to satisfy storage volume access requirements of the VM.

Preferentially selecting among the candidate physical machines to host the VM, may include selecting a migration target having one or more of: sufficient processing bandwidth, sufficient memory, sufficient network bandwidth and sufficient storage access bandwidth, to host the storage volume access requirements of the VM.

Preferentially selecting among the candidate physical machines to host the VM may also include selecting a migration target having certain threshold proximity and certain threshold access latency to said storage volumes accessed by the VM. Such preferential selection may also include determining a single rank value for each candidate physical machine based on one or more of: spare path capacity and lower latency to the storage volumes accessed by the VM; wherein preferentially selecting among the candidate physical machines to host the VM further includes favoring machines with higher ranking value representing higher spare path capacity and lower latency to the storage volumes accessed by the VM.

These and other features, aspects and advantages of the invention will become understood with reference to the following description, appended claims and accompanying figures.

DETAILED DESCRIPTION OF THE INVENTION

The invention provides a method and system of storage-aware selection of virtual machine migration targets. In one embodiment the invention provides a storage-aware process for selecting target machines for virtual machine (VM) migration. Such a storage-aware selection process includes determining one or more candidate machines for a VM migration, and then performing target selection, wherein based on certain criteria, at least one target machine is preferentially selected among the candidate machines.

Determining one or more candidate machines may include determining one or more candidate machines for a VM migration, wherein said criteria may require that each candidate machine possesses sufficient spare processing capacity (e.g., CPU, memory, network and storage bandwidth), to host the VM.

Target selection may involve preferentially selecting among the candidate machines, one or more migration targets for the VM, wherein said criteria may require that each selected machine posses certain current storage connectivity and spare path capacity to meet the input/output (IO) requirements between the VM and its storage volumes.

Target selection may involve preferentially selecting among the candidate machines one or more migration targets for the VM, wherein said criteria may require that each selected machine posses certain proximity or latency to the storage volumes of the VM. Selection can be among multiple candidate machines at differing latencies from the VM's storage location.

Target selection may further involve combining latency from target machine to storage location, path capacity from target machine to storage location, and resulting utilization (CPU, memory, network, storage bandwidth) at the target machine, to compute a single rank value for each feasible target machine. Said criteria may require favoring machines with higher spare path capacity, lower latency to the VM's storage volumes and/or lower resulting processing utilization (e.g., CPU, memory, network and storage bandwidth utilizations) at the target machine. Then a candidate machine with the highest rank value is selected as a target machine.

The storage-aware selection process can be performed in an optional recommendation mode where the migration selections (suggestions) are provided as a recommendation to an administrator who can then choose to accept them or not. If accepted by the administrator, information about migration selection may be fed to an orchestrator module that executes the VM migration from a source machine to one or more selected target machines.

Figure 1:
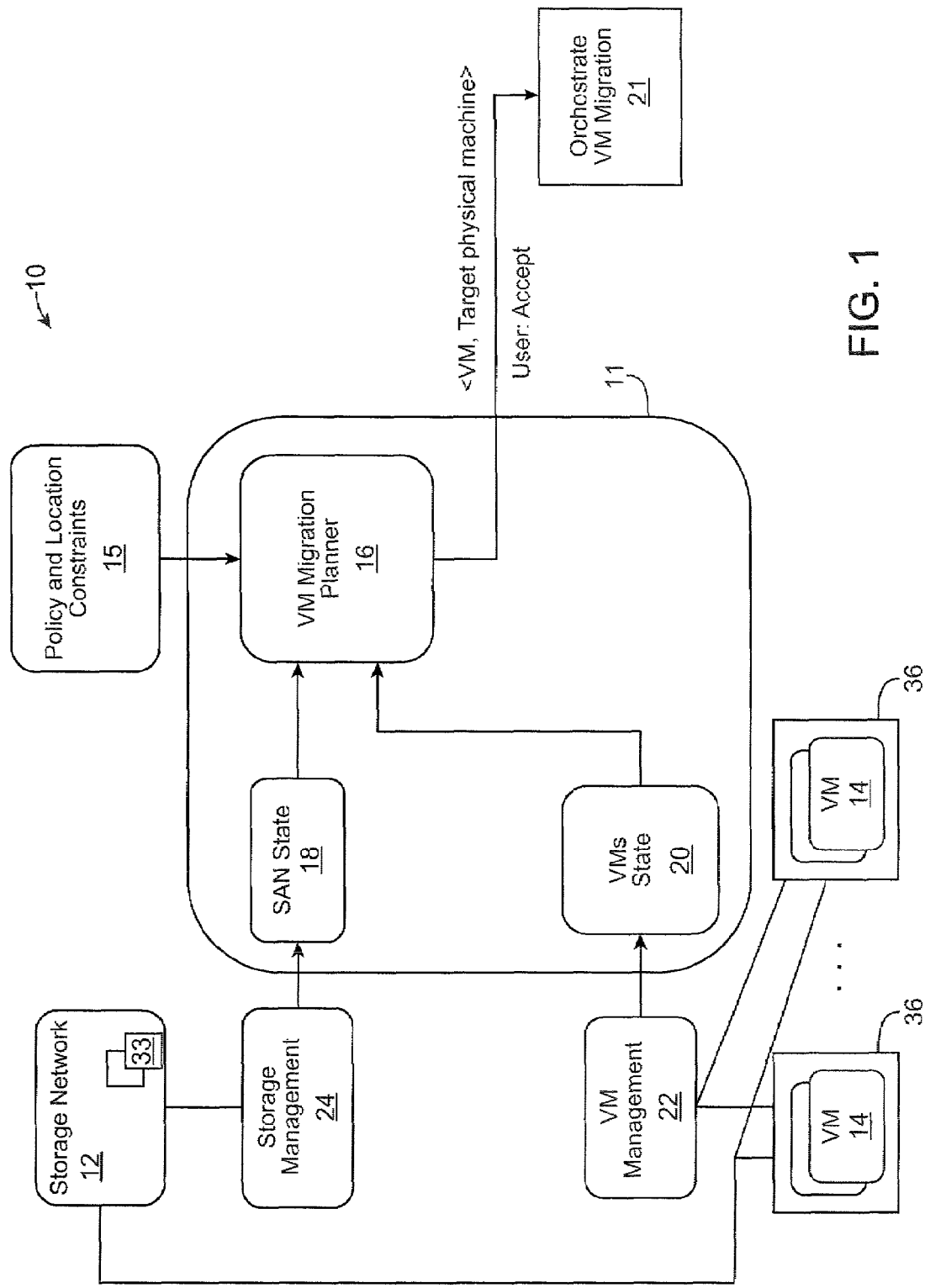
FIG. 1 show a system architecture implementing a storage-aware process for selecting target machines for virtual machine (VM) migration, according to an embodiment of the invention.

FIG. 1 shows a functional architecture 10 implementing an example storage-aware selection process according to the invention. This implementation involves dynamically monitoring status of a storage network (e.g., storage area network (SAN)) 12 and VMs 14, wherein a central migration component 11 processes the monitored information based on a storage-aware selection process described herein. The central migration component 11 includes a VM Migration Planner 16 that processes the monitored information. Each of multiple physical machines (hosts) 36 executes plural VMs 14.

A VM management module 22 performs dynamic VM monitoring for each VM 14, continuously measuring the CPU, memory and network bandwidth resources used by each VM over time as historical values (example VM monitoring is described in "Black-box and Grey-box Strategies for Virtual Machine Migration", Timothy Wood, Prashant Shenoy, Arun Venkatramani, Mazin Yousif, proceedings of USENIX NSDI 20071; Dynamic Placement of Virtual Machines for Managing SLA Violations", Norman Bobroff, Andrzej Kochut, Kirk Beaty, 10th IEEE Symposium on Integrated Management (IM 2007); incorporated herein by reference). The historical values are then combined with basic prediction techniques to estimate the ongoing needs of each VM 14 for CPU, memory and network bandwidth resources, as VMs state information 20. A resource need vector is generated for each VM 14 as <CPU, memory, network> which describes processing requirements of each VM 14.

Other methods of obtaining a vector of VM requirements for each resource can be used here. As such, VMs state information 20 includes monitored information output from the VM management module 22. The output from the VM migration planner 16 may be automatically fed to a VM migration orchestrator 21, or in a recommendation mode, said output is provided to a user who may choose to accept it or not. If accepted, said output is then sent to the orchestrator 21.

A storage management module 24 (e.g., IBM TPC, HP OpenView) continuously monitors the various components of the storage network 12 (e.g., hosts, fabrics, switches, controllers) and provides SAN state information 18 (physical machines, storage locations, etc.). The information can be used to construct the storage network topology and the dynamic connectivity and reachability information.

Figure 2:
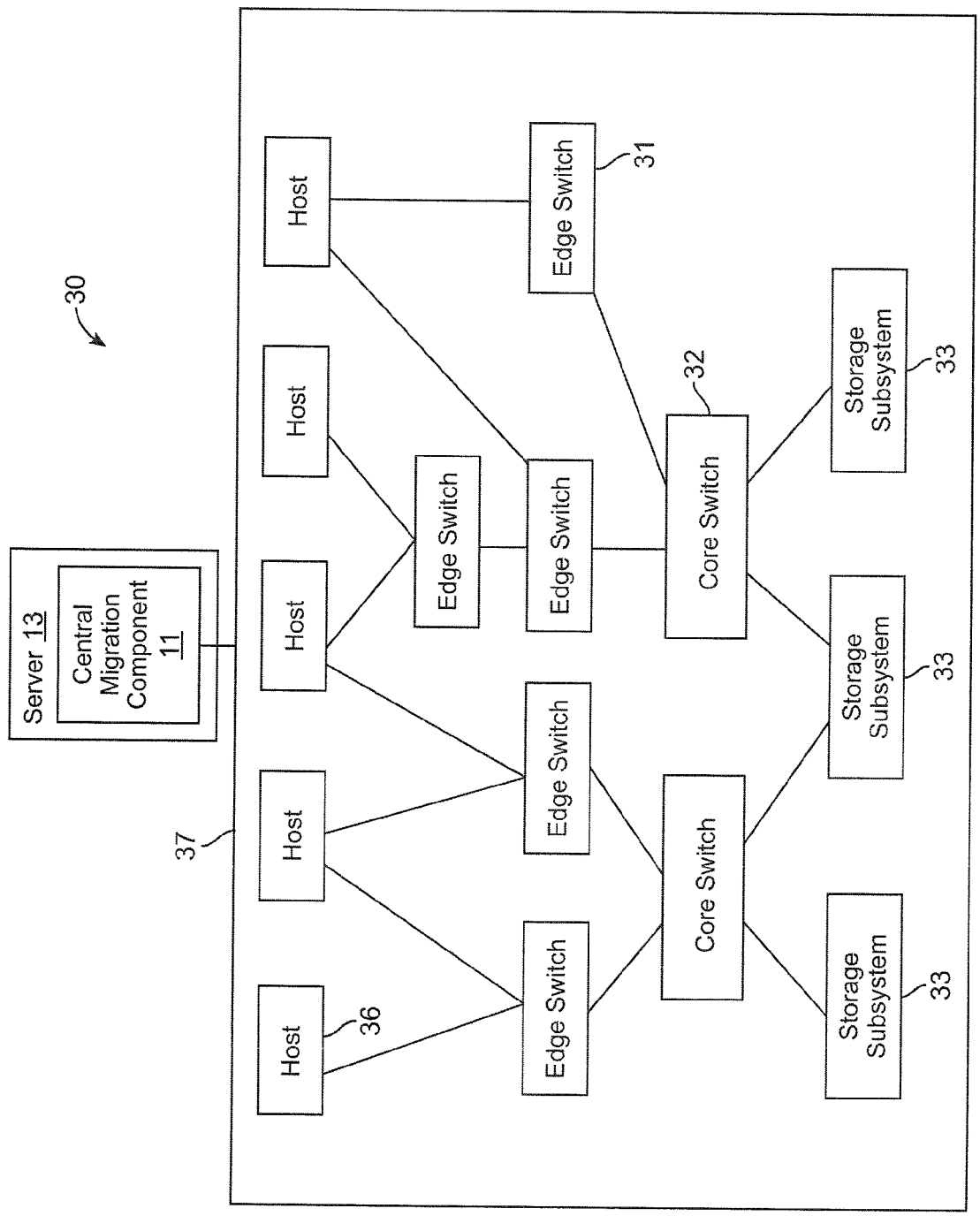
FIG. 2 show a system topology implementing a storage-aware process for selecting target machines for virtual machine (VM) migration, according to an embodiment of the invention.

An example computing environment 30 is shown in FIG. 2, including the central migration component 11 running on a sever machine 13, for monitoring and managing a computing system 37. The computing system 37 includes hosts 36, wherein each host includes at least a CPU. At least a plurality of the hosts 36 provides computing platforms for multiple VMs. The computing system 37 further includes edge switches 31 and core switches 32. The switches connect the hosts 36 to storage subsystem volumes 33 (FIGS. 1-2). The storage network 12 in FIG. 1 may include one or more of the storage subsystem volumes 33.

The parameters gathered by the storage management module 24 from the storage network 12 include the connectivity links between ports on switches 31, 32 and hosts 36. Dynamic monitoring provides a send and receive packet rate and a KB rate for each fiber channel (FC) port on each of switches 31, 32, and for each switch as an aggregate. Similar statistics are gathered for ports of each subsystem 33 and for the host bus adapter (HBA) of each host 36. At the storage subsystem level, the dynamic monitoring also gathers statistics at the FC port, rank and volume level. For each volume level, monitoring provides metrics about {normal/sequential} {read/write} IO rate, average transfer size in KBs etc. Such information for each VM/workload is used to obtain estimates for storage data transfer bandwidth (in MBs/sec) and storage command throughput (in IOPs/sec) between an application VM 14 and its storage volume in the network storage 12. The estimates in turn translate to capacity requirements on the path from host to the storage volumes for the VM. As such, SAN state information 18 includes monitored information output from the storage management module 24. The SAN state 18 and VMs state 20 can optionally also include Offline SAN and Application WorkloadInput information.

The VM migration planner 16 in the central migration component 11 utilizes current state of the system (i.e., storage network information 18 and VM state information 20) and determines where to migrate one or more of the VMs 14. For example, the VM migration planner 16 first selects an overloaded physical machine (e.g., one of the host machines 36 in FIG. 2). An overloaded physical machine can be a physical machine where the estimated needs of the VMs currently running on that machine exceed a certain threshold of the machine's available processing capacity along any of the resources. The threshold can be e.g., 100% or a user provided target such as, e.g., 85%.

The VMs currently residing on the overloaded machine are sorted in decreasing order of UWeight-to-size ratio (UWeight/size) where UWeight (unified weight) is a measure of multi-dimensional resource requirements of a VM combined into a single metric for linear ordering purposes, and size is an estimate of memory foot print (usage) of a VM. The smaller the size the lower the cost of VM migration. UWeight can be e.g., 1/(1-cpu) (1-mem)(1-net), wherein cpu, mem and net for a VM are, respectively, the fractional equivalents of CPU, memory and network bandwidth requirements of the VM. UWeight-to-size ratio is similar to VM volume. For the case of a physical machine, UWeight is defined similarly using the fractional equivalents of the CPU, memory and network capacity of the machine being used. The larger the UWeight of a physical machine the larger the current load of that physical machine. The larger the UWeight of a VM the larger the resource needs of the VM.

The VM migration planner 16 sorts a list of the VMs on the overloaded (source) machine in decreasing order of their UWeight-to-size ratio and selects the first VM in the sorted VM list to find a suitable target physical machine where the VM can be migrated to. For the VM thus selected, the physical machines are sorted in decreasing order of UWeights as potential target physical machines. In other words, a list of the target physical machines (hosts) 36 is sorted from most overloaded to least overloaded in terms of spare capacity (i.e., spare CPU, memory, network and storage bandwidth, etc.). The physical machines in the sorted machine list are considered one by one starting from the least loaded. UWeights are defined both for VMs and for physical machines (PMs). For VMs, UWeight(VM a)=1/((1-cpu _req)*(1-mem_req)*(1-net_req)), where the cpu_req, mem_req, and net_req are the cpu, memory, and net requirements of the VM as fractions of the machine capacity. As such, the larger the UWeight of a VM, the larger is its resource requirement. For PMs, UWeight (PM b)=1/((1-cpu_load)*(1-mem_load)*(1-net_load)), where the cpu_load, mem_load, and net_load are the cpu, memory, and net loads on the physical machine currently. The larger the UWeight of a physical machine, the larger is its current load. UWeight for VMs can be denoted as VMWeight, and UWeight for PMs can be denoted as PMWeight.

For a selected virtual machine 14, VM_a, and a selected (least loaded) physical machine 36, PM_b, the VM Migration planner 16 checks if: (i) the CPU, memory and network bandwidth needs of VM_a can be met within the total CPU, memory and network bandwidth capacity of PM_b; (ii) the physical machine PM_b is reachable from the storage volumes in storage network 12 accessed by VM_a; and, (iii) there is sufficient capacity on the path (i.e., switches) from PM_b to said storage volumes accessed by VM_a, to accommodate the storage bandwidth (MBs/sec) and storage command throughput (IOPs/sec/GB) estimated for the VM_a. For example, all switches on the path from the PM_b to the storage location (controller or JBOD FIG. 2), may have sufficient spare capacity (spare CPU, memory, network and storage bandwidth, etc.) to accommodate the throughput need of VM_a.

If the above three tests (i), (ii) and (iii) all pass, then the VM migration planner 16 assigns a ranking Value for VM_a and PM_b as follows:

Value(VM_a, PM_b)= f(latency from PM_b to storage volumes for
    VM_a, new_cpu_util at PM_b,
    new_mem_util at PM_b,
    new_net_bandwidth_util at PM_b,
    new_path_capacity_util from PM_b to storage
    volumes for VM_a), wherein the four quantities: new_cpu_util at PM_b, new_mem_util at PM_b, new_net_bandwidth_util at PM_b, and new_path_capacity_util from PM_b to storage volumes for VM_a, are the new utilization percentages if this VM_a were moved to the PM_b. A candidate Value function is (1-cpu)*(1-mem)*(1-net)*(1-path-cap)/latency. This automatically favors machines with higher spare path capacity and lower latency. Other candidate Value functions can also be used. Value (VM_a, PM_b) represents how appropriate a candidate machine PM_b is for hosting VM_a. Value (VM_a, PM_b) is a measure of the different parameters in the function which affect the performance of VM_a on PM_b. The planner selects the PM with the highest Value as the target for VM_a.

Among the different candidate physical machines 36 that pass the above three tests (i), (ii) and (iii), for VM_a, the VM migration planner 16 selects a physical machine 36 with the highest Value (VM_a, PM_b) as the target machine for migrating VM_a to. The process repeats until sufficient VM migrations are performed to offload from the overloaded physical machines (e.g., the load on all physical machines falls below a selected threshold utilization percentage).

The resulting migrations found can either be executed automatically using a VM migration orchestrator such as VMotion, or the migration suggestions can be provided as a recommendation to an administrator who can then choose to accept them or not. If accepted by the administrator, then the suggested migrations may be fed to a VM migration orchestrator 21 for execution. A policy and location constraints module 15 can suggest auxiliary constraints such as "no more than so many VMs on a particular physical machine" or "VMs of this type can only run on PMs of this type", and so on. The migration planner uses such policies to prune the candidate list.

Examples of computing platforms on which a storage-aware VM migration planner according to the invention can be implemented include integrated server, storage and network management platforms (e.g., IBM Leopard initiative, HP OpenView with AppIQ, EMC ControlCenter).

Figure 3:
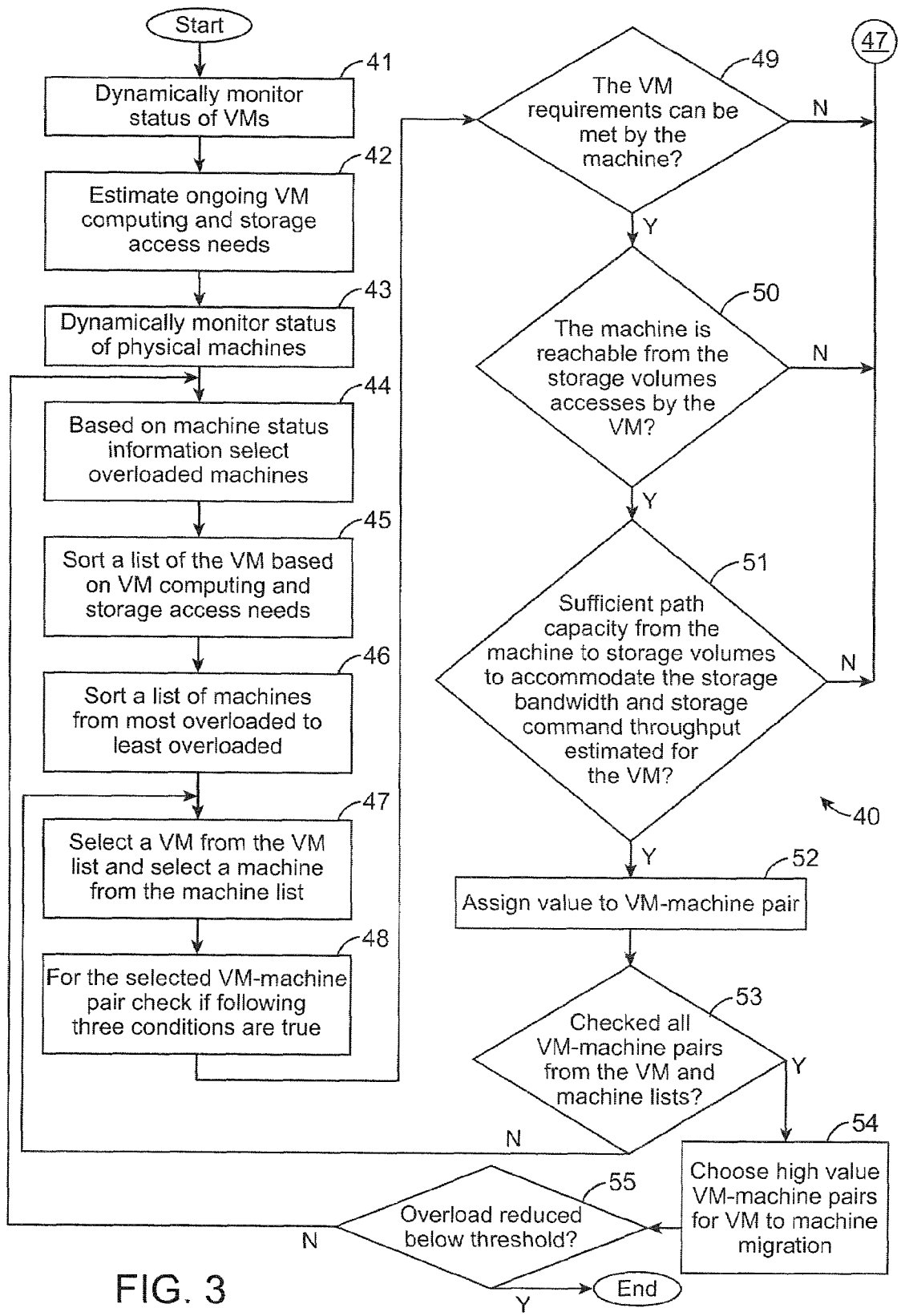
FIG. 3 shows a flowchart of steps for a storage-aware process for selecting target machines for virtual machine (VM) migration, according to an embodiment of the invention.

FIG. 3 shows a flowchart of steps for a storage-aware process 40 for selecting target machines for VM migration in a computing system, according to an embodiment of the invention. The process 40 includes the following steps:

Step 41: Dynamically monitor the system by monitoring the status of each VM continuously measuring the CPU, memory and network bandwidth resources used by each VM over time, and generate VM status (state) information.

Step 42: Based on the VM status information, estimate the ongoing computing and storage access needs of each VM, including VM needs for CPU, memory and network bandwidth resources, storage bandwidth and storage command throughput.

Step 43: Dynamically monitor physical machines and storage network (e.g., hosts, fabrics, switches, controllers, etc.) and generate status (state) information.

Step 44: Based on the current machine status information select an overloaded physical machine.

Step 45: Sort a list of the VMs on the selected machine in decreasing order of VM processing need (VM computing and storage access needs) based on multi-dimensional resource requirements and memory foot print.

Step 46: Sort a list of physical machines from most overloaded to least overloaded.

Step 47: Select a VM from the sorted VM list to find a suitable target physical machine the VM can be migrated to, select a machine from the sorted machine as a potential target.

Step 48: For each selected VM in the sorted VM list and each selected physical machine in the sorted machine list (i.e., selected VM-machine pair), check if the following three conditions are true.

Step 49: Can the VM processing requirements be met within the processing capacity of the selected physical machine?

Step 50: Is the selected physical machine reachable from the storage volumes the selected VM accesses?

Step 51: Is there sufficient capacity on the path from the selected physical machine to the storage volumes the selected VM accesses, to accommodate the storage bandwidth and storage command throughput estimated for the selected VM?

Step 52: If all three conditions are true, then assign a value to the selected VM-machine pair (e.g., Value (VM_a, PM_b) favoring machines with higher spare path capacity and lower latency), otherwise go back to step 47.

Step 53: Repeat steps 47-52 for all VM and machine pairs in the sorted lists.

Step 54: Choose among the selected pairs those pairs with the highest values as migration pairs (i.e., the VM and machine pair that have a high value are chosen for migrating the VM to the machine).

Step 55: Repeat steps 44-54 until sufficient migrations are performed to offload from all the overloaded physical machines, i.e. the load on all physical machines is reduced to below a chosen threshold utilization percentage.

As is known to those skilled in the art, the aforementioned example architectures described above, according to the invention, can be implemented in many ways, such as program instructions for execution by a processor, as computer implemented instructions, as computer program product, as logic circuits, as an application specific integrated circuit, as firmware, etc. The invention has been described in considerable detail with reference to certain preferred versions thereof; however, other versions are possible. Therefore, the spirit and scope of the appended claims should not be limited to the description of the preferred versions contained herein.

What is claimed is:

1. A method of selecting a target physical machine for a virtual machine (VM) migration, comprising:
   determining one or more candidate physical machines with sufficient spare capacity to host the VM by dynamically:
      monitoring status of each VM and each physical machine at a storage subsystem level, wherein dynamically monitoring status of VMs comprises continuously measuring CPU, memory and network bandwidth resources used by each VM over time to estimate ongoing needs of each VM for CPU, memory and network bandwidth resources, and wherein dynamically monitoring status of each physical machine results in providing measurements for a send and receive packet rate for each fiber channel port on each switch in the SAN;
      gathering statistics and measurements for obtaining estimates for storage data transfer bandwidth and storage command throughput between the VM and associated storage volume in a storage area network (SAN), wherein the estimates are translated to capacity requirements on paths from host to storage volumes for each VM;
      preferentially selecting as VM migration targets among the candidate physical machines one or more physical machines with sufficient storage volume connectivity and spare path capacity to satisfy storage volume access requirements of the VM, to host the VM, wherein VMs and physical machines are ranked, each VM and each candidate physical machine are paired based on the ranking, and VMs are selected for migration to a new assigned physical machine based on ranking values; and
      continuously migrating VMs to selected candidate physical machines until sufficient migrations are performed to offload all overloaded physical machines so that load on all overloaded physical machines are reduced below a predetermined utilization threshold, wherein migrating VMs to selected candidate physical machines includes migration away from a source physical machine to the selected candidate physical machines.

2. The method of claim 1 further comprising determining storage volume connectivity and spare path capacity to the storage volume for one or more candidate physical machines for selection as target machines.

3. The method of claim 1 further including determining server and storage access capacity requirements of the VM and selecting candidate machines based on the VM server and storage access capacity requirements.

4. The method of claim 1, wherein preferentially selecting among the candidate physical machines to host the VM, further includes selecting a migration target having sufficient storage volume connectivity and spare path capacity, to host the storage volume access requirements of the VM.

5. The method of claim 1 further including determining proximity and access latency of each candidate machine to one or more storage volumes accessed by the VM;
   continuously recommending migration of VMs to selected candidate physical machines; and
   selecting migration of selected VMs until sufficient migrations are performed to offload all overloaded physical machines so that load on all overloaded physical machines are reduced below a predetermined utilization threshold.

6. The method of claim 5, wherein preferentially selecting among the candidate physical machines to host the VM further includes selecting a migration target having certain threshold proximity and certain threshold access latency to said storage volumes accessed by the VM.

7. The method of claim 6 further including determining a single rank value for each candidate physical machine based on one or more of: spare path capacity and lower latency to the storage volumes accessed by the VM;
   wherein preferentially selecting among the candidate physical machines to host the VM further includes favoring machines with higher ranking value representing higher spare path capacity and lower latency to the storage volumes accessed by the VM.

8. The method of claim 6 further including determining a single rank value for each candidate physical machine based on one or more of: spare path capacity and lower latency to the storage volumes accessed by the VM, and lower resulting processing, memory, network and storage bandwidth utilizations at the target machine;
   wherein preferentially selecting among the candidate physical machines to host the VM further includes selecting a candidate with the highest rank value as the target machine.

9. A system comprising:
   one or more virtual machines (VMs) hosted by one or more physical machines; and
   a virtual machine (VM) migration module for selecting a target physical machine for a virtual machine (VM) migration, comprising:
      a monitor configured for determining one or more candidate physical machines with sufficient spare capacity to host the VM by dynamically:
         monitoring status of each VM and each physical machine at a storage subsystem level, wherein dynamically monitoring status of VMs comprises continuously measuring CPU, memory and network bandwidth resources used by each VM over time to estimate ongoing needs of each VM for CPU, memory and network bandwidth resources, and wherein dynamically monitoring status of each physical machine results in providing measurements for a send and receive packet rate for each fiber channel port on each switch in the SAN; and
         gathering statistics and measurements for obtaining estimates for storage data transfer bandwidth and storage command throughput between the VM and associated storage volume in a storage area network (SAN), wherein the estimates are translated to capacity requirements on paths from host to storage volumes for each VM; and
      a migration planner configured for preferentially selecting as VM migration targets among the candidate physical machines one or more physical machines with sufficient storage volume connectivity and spare path capacity to satisfy storage volume access requirements of the VM to host the VM, wherein VMs and physical machines are ranked, and each VM and each candidate physical machine are paired based on the ranking, and VMs are selected for migration to a new assigned physical machine based on ranking values, the migration planner further continuously migrates VMs to selected candidate physical machines until sufficient migrations are performed to offload all overloaded physical machines so that load on all overloaded physical machines are reduced below a predetermined utilization threshold, wherein migrating VMs to selected candidate physical machines includes migration away from a source physical machine to the selected candidate physical machines.

10. A computer-implemented method for selecting a target physical machine for a virtual machine (VM) migration, comprising:
  determining one or more candidate physical machines with sufficient spare capacity to host the VM by dynamically:
    monitoring status and continuously obtaining measurements for each VM and each physical machine at a storage subsystem level;
    gathering statistics and measurements for obtaining estimates for storage data transfer bandwidth and storage command throughput between the VM and associated storage volume in a storage area network (SAN);
    preferentially selecting as VM migration targets among the candidate physical machines one or more physical machines with sufficient storage volume connectivity and spare path capacity to satisfy storage volume access requirements of the VM, to host the VM;
    performing migration of a selected VM migration target to a selected candidate physical machine; and
    continuously migrating VMs to selected candidate physical machines until sufficient migrations are performed to offload all overloaded physical machines so that load on all overloaded physical machines are reduced below a predetermined utilization threshold, wherein migrating VMs to selected candidate physical machines includes migration away from a source physical machine to the selected candidate physical machines.

11. The computer-implemented method of claim 10, wherein determining one or more candidate physical machines further includes determining the VM spare capacity requirement VMWeight as:

$$VMWeight(VM)=1/((1-cpu\_req)*(1-mem\_req)*(1-net\_req)),$$

wherein cpu_req, mem_req, and net_req are the cpu, memory, and net requirements of the VM as fractions of the machine capacity.

12. The computer-implemented method of claim 11, wherein determining one or more candidate physical machines further includes determining the machine spare capacity PMWeight of each physical machine PM as:

$$UWeight(PM)=1/((1-cpu\_load)*(1-mem\_load)*(1-net\_load)),$$

wherein the cpu_load, mem_load, and net_load are the cpu, memory, and net loads on the physical machine PM.

13. A program product stored on a computer useable non-transitory storage medium for selecting a target physical machine for a virtual machine (VM) migration in a storage area network (SAN), the program product comprising program code for causing a computer system to perform the following steps:
  determining one or more candidate physical machines with sufficient spare capacity to host the VM by dynamically:
    monitoring status of each VM and each physical machine at a storage subsystem level, wherein dynamically monitoring status of VMs comprises continuously measuring CPU, memory and network bandwidth resources used by each VM over time to estimate ongoing needs of each VM for CPU, memory and network bandwidth resources, and wherein dynamically monitoring status of each physical machine results in providing measurements for a send and receive packet rate for each fiber channel port on each switch in the SAN; and
    gathering statistics and measurements for obtaining estimates for storage data transfer bandwidth and storage command throughput between the VM and associated storage volume in the SAN, wherein the estimates are translated to capacity requirements on paths from host to storage volumes for each VM;
    preferentially selecting as VM migration targets among the candidate physical machines one or more physical machines with sufficient storage volume connectivity and spare path capacity to satisfy storage volume access requirements of the VM, to host the VM, wherein VMs and physical machines are ranked, and each VM and each candidate physical machine are paired based on the ranking, and VMs are selected for migration to a new assigned physical machine based on ranking values;
    determining proximity and access latency of each candidate machine to one or more storage volumes accessed by the VM;
    continuously recommending migration of VMs to selected candidate physical machines; and
    selecting migration of selected VMs until sufficient migrations are performed to offload all overloaded physical machines so that load on all overloaded physical machines are reduced below a predetermined utilization threshold.

14. The program product of claim 13, wherein determining one or more candidate physical machines further includes determining the VM spare capacity requirement VMWeight as:

$$VMWeight(VM)=1/((1-cpu\_req)*(1-mem\_req)*(1-net\_req)),$$

wherein cpu_req, mem_req, and net_req are the cpu, memory, and net requirements of the VM as fractions of the machine capacity.

15. The program product of claim 14, wherein determining one or more candidate physical machines further includes determining the machine spare capacity PMWeight of each physical machine PM as:

$$UWeight(PM)=1/((1-cpu\_load)*(1-mem\_load)*(1-net\_load)),$$

wherein the cpu_load, mem_load, and net_load are the cpu, memory, and net loads on the physical machine PM.

16. A method of selecting a target physical machine for a virtual machine (VM) migration, comprising:
  determining one or more candidate physical machines with sufficient spare capacity to host the VM by dynamically:
    monitoring status of each VM and each physical machine at a storage subsystem level, wherein dynamically monitoring status of VMs comprises continuously measuring CPU, memory and network bandwidth resources used by each VM over time to estimate ongoing needs of each VM for CPU, memory and network bandwidth resources, and wherein dynamically monitoring status of each physical machine results in providing measurements for a send and receive packet rate for each fiber channel port on each switch in the SAN;
    gathering statistics and measurements for obtaining estimates for storage data transfer bandwidth and storage command throughput between the VM and associated storage volume in a storage area network (SAN), wherein the estimates are translated to capacity requirements on paths from host to storage volumes for each VM;

preferentially selecting as VM migration targets among the candidate physical machines one or more physical machines with sufficient storage volume connectivity and spare path capacity to satisfy storage volume access requirements of the VM, to host the VM, wherein VMs and physical machines are ranked, each VM and each candidate physical machine are paired based on the ranking, and VMs are selected for migration to a new assigned physical machine based on ranking values; and determining proximity and access latency of each candidate machine to one or more storage volumes accessed by the VM;

continuously recommending migration of VMs to selected candidate physical machines; and selecting migration of selected VMs until sufficient migrations are performed to offload all overloaded physical machines so that load on all overloaded physical machines are reduced below a predetermined utilization threshold.

* * * * *